United States Patent
Joiner

(10) Patent No.: US 9,316,567 B2
(45) Date of Patent: Apr. 19, 2016

(54) AUTOMOTIVE RATTLE DETECTION SYSTEM

(71) Applicant: Dustin Joiner, Atlanta, GA (US)

(72) Inventor: Dustin Joiner, Atlanta, GA (US)

( * ) Notice: Subject to any disclaimer, the term of this patent is extended or adjusted under 35 U.S.C. 154(b) by 338 days.

(21) Appl. No.: 13/740,178

(22) Filed: Jan. 12, 2013

(65) Prior Publication Data

US 2013/0205905 A1    Aug. 15, 2013

Related U.S. Application Data

(60) Provisional application No. 61/586,258, filed on Jan. 13, 2012.

(51) Int. Cl.
*G01M 17/04* (2006.01)
*G01M 7/00* (2006.01)
*G01M 17/007* (2006.01)

(52) U.S. Cl.
CPC .............. *G01M 17/04* (2013.01); *G01M 7/00* (2013.01); *G01M 17/007* (2013.01)

(58) Field of Classification Search
CPC ...... G01M 7/00; G01M 17/04; G01M 17/007
USPC ........ 73/669, 670, 11.05, 11.07, 11.08, 11.09
See application file for complete search history.

(56) References Cited

U.S. PATENT DOCUMENTS

| | | | |
|---|---|---|---|
| 2,188,763 A | | 1/1940 | Swan et al. |
| 3,218,058 A | * | 11/1965 | Smith ........................ 269/166 |
| 3,736,843 A | | 6/1973 | Leibundgut et al. |
| 4,576,529 A | * | 3/1986 | Forrer ......................... 408/240 |
| 5,435,185 A | | 7/1995 | Eagan |
| 5,551,298 A | * | 9/1996 | Rayment ............... G01M 7/025 73/579 |
| 6,691,573 B2 | | 2/2004 | Silvagi et al. |
| 7,007,548 B2 | | 3/2006 | Jahn et al. |
| 7,066,457 B2 | * | 6/2006 | Gerritsen et al. ................. 269/6 |
| 7,181,971 B1 | | 2/2007 | Sauer et al. |
| 7,320,486 B2 | * | 1/2008 | Geppert et al. .............. 285/420 |
| 2003/0119448 A1 | | 6/2003 | Arntz |

* cited by examiner

*Primary Examiner* — J M Saint Surin

(57) ABSTRACT

A system for detecting rattles, squeaks and other annoying sounds in a vehicle can include a vibration generator and a clamping device configured to attach to the vehicle.

24 Claims, 5 Drawing Sheets

AUTOMOTIVE RATTLE DETECTION SYSTEM

INCORPORATION BY REFERENCE

U.S. Pat. No. 2,188,763 to Swan et al, U.S. Pat. No. 3,736,843 to Leibundgut et al, U.S. Pat. No. 5,435,185 to Eagan, U.S. Pat. No. 6,101,432 to Yuan Her et al, U.S. Pat. No. 6,131,454 Kopp et al, U.S. Pat. No. 6,360,607 to Charette et al, U.S. Pat. No. 6,389,900 to Leist et al, U.S. Pat. No. 6,691,573 to Silvagi et al, U.S. Pat. No. 7,007,548 to Jahn et al, U.S. Pat. No. 7,181,971 to Sauer et al, and U.S. Published Patent Application No. 2003/0119448 are hereby incorporated by reference in their entirety as though they were set forth below.

TECHNICAL FIELD

The present invention relates to a system for detecting rattles, squeaks and other annoying sounds in a vehicle such as, for example, an automobile.

BACKGROUND

Modern vehicles have many interior and exterior components that, over the life of the vehicle, can produce squeaks, rattles, and other annoying sounds. Not surprisingly, vehicle rattles and noise-related complaints are very common at service centers. To achieve high customer satisfaction, automobile manufacturers seek to prevent squeaks, rattles, and other undesirable noises. However, this is not a simple task, since these noises can have a variety of sources, such as loose fasteners or surfaces moving relative to each other. These noises can be difficult and time consuming to locate, since they only appear when the vehicle is in use.

One method for locating a noise involves test-driving the vehicle by a trained mechanic. Often, a second mechanic must ride along in the vehicle to help locate the noise source. To increase the likelihood of locating the noise source, heating and air conditioning systems are turned off and windows are closed to reduce ambient noise levels. These situations can cause extreme discomfort to the automotive mechanics in freezing winter weather or extremely hot summer weather. Also, it can be unsafe for mechanics to operate the vehicle while their attention is focused on locating the noise. This approach is also harmful to the vehicle, since the mechanic often searches for uneven and rough roads to improve the likelihood of reproducing the noise, and striking potholes and bumps at significant speeds can cause misalignment of the wheels and worse. With this method, it can take several trips simply to locate the noise. Once the noise is located, the mechanic must disassemble the dash, door panel or console and continue to drive the vehicle while attempting to tighten, insulate or isolate the problem area. This method can be very time consuming and impractical.

As an alternative to test driving the vehicle, systems have been developed that allow the vehicle to remain stationary while the noise is located. But these systems have many disadvantages. They are often large and occupy considerable floor space and must be securely mounted to the floor. They can be costly to manufacture, purchase and transport, and the cost of transporting the machines can adversely affect their resale. In addition, they are complex and require specialized training to operate.

Some of these systems require the user to position the vehicle on a machine that functions like a chassis dynamometer. In one example, the tires rest against a roller assembly driven by an electromechanical drivetrain that is electrically powered. Each roller in the assembly can individually rotate around its center axis as the assembly itself rotates over a specific RPM range causing the longitudinal side of each roller to continuously strike the tires' treaded lower half at a predetermined position. This position is primarily a function of the tire size and the roller assembly's diameter and mounting position in the detection system. As the rollers continuously strike the tire, vibrations and shock waves are produced in the vehicle causing the same annoying rattles, squeaks and noises that are noticeable during driving conditions. A trained operator is required to locate the problem, repair it, and determine if the repair was successful. Rollers assemblies can be hazardous to the operator, since they include numerous moving parts that exert substantial forces and have minimal shielding. These systems can also cause damage to the vehicle. For instance, damage can occur to an automatic transmission where a front pump responsible for circulating transmission fluid is powered by the engine crankshaft, and in a hybrid vehicle, where overcharging of a battery pack or damage to an inverter can occur.

DETAILED DESCRIPTION

Figure 1:
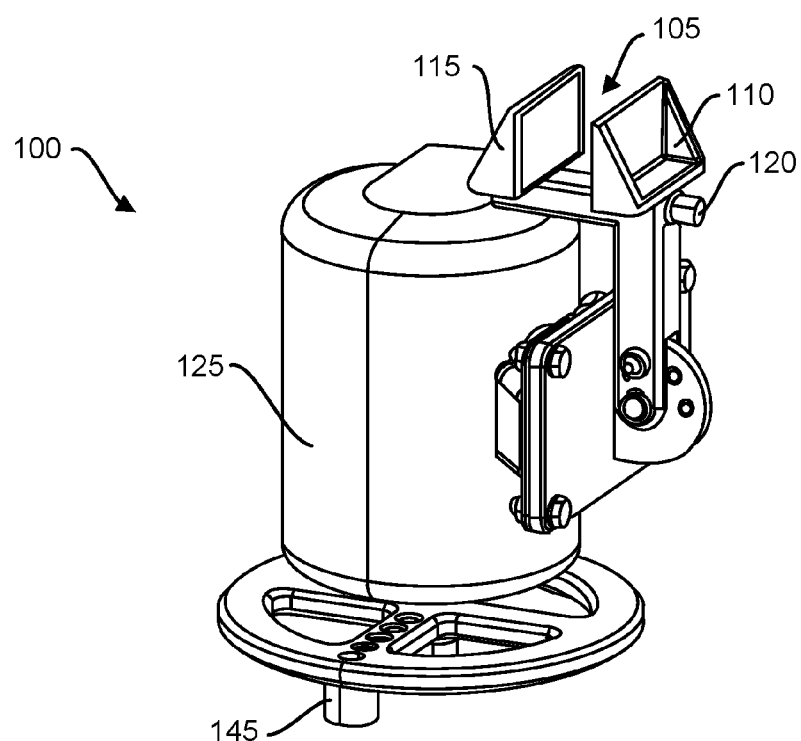
FIG. 1 is a top perspective view of an example vibration generator.
Figure 2:
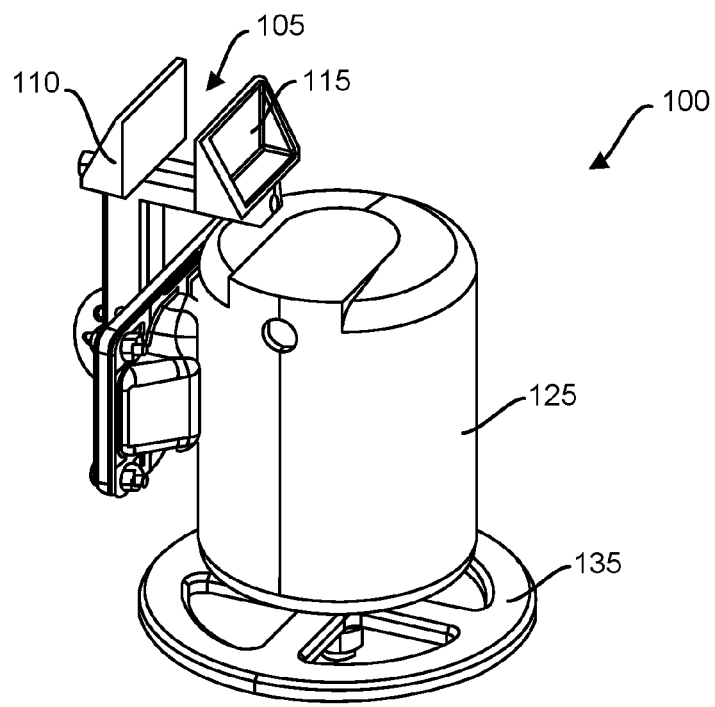
FIG. 2 is a top perspective view of the example vibration generator in FIG. 1.
Figure 3:
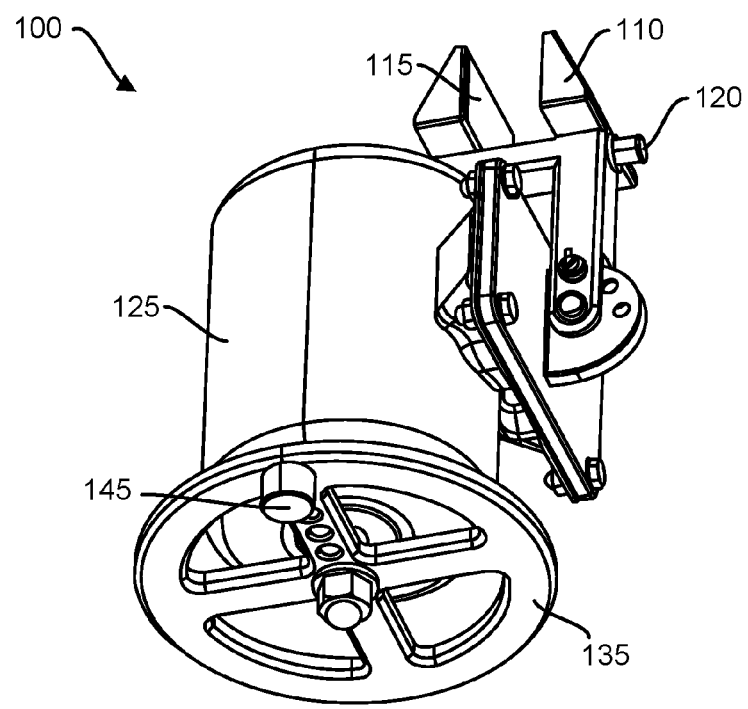
FIG. 3 is a bottom perspective view of the example vibration generator in FIG. 1.

A system for detecting rattles, squeaks, or other annoying or unwanted sounds (i.e. noise) in a vehicle can be a portable unit that attaches to the vehicle. The system can be operated by an individual and may not require sophisticated training courses, certification, or lengthy instruction manuals to operate. The cost and size of the system are sufficiently small to allow for convenient use and storage of the unit at any automotive service center, manufacturing plant, oil and lube facility, or home. The system can be used by shade tree mechanics, who often restore and maintain older vehicles that frequently suffer from rattles, squeaks, or other noises. The system allows a noise to be located much more quickly than existing systems or methods.

The system described herein can be used in any suitable way to locate a squeak, rattle, or unwanted sound. In one example, the vehicle owner can inform a technician where noise is originating from in the vehicle. If the driver is unsure of the location, the technician can test drive the vehicle to identify the general location of the noise (e.g. dash, trunk, etc.). The technician can then park the vehicle and attach the system to the vehicle, such as, for example, to a pinch weld under the area where the noise is emanating from. The technician can then sit inside the vehicle and adjust the vibrational frequency of the system. If the unwanted noise is not generated, the technician can increase the amplitude of the vibrations by increasing the mass of the system or by adjusting the position of the mass relative to a centerline axis of the shaft. The technician can also attempt to swivel the motor to change the axis through which vibration is transmitted to the vehicle. Upon finding the correct combination, the noise will be generated at a constant frequency, making the noise much easier to find. Once the location of the noise is located, it can be repaired or stopped.

The system described herein has many advantages over existing systems. First, the system is much smaller and less complex than existing systems. As a result, the system can be produced for a fraction of the cost of existing systems. The system does not require specialized training to operate. Instead, a simple set of instructions can accompany the product, as is common with other consumer products. The system is safer to operate than existing systems, since the wheels of the vehicle remain stationary during use. The operator can sit safely inside the vehicle while searching for the noise. Since the wheels of the vehicle do not rotate during the rattle detection process, the system does not pose a risk of damaging costly vehicle subsystems, like an automatic transmission or hybrid components. Additionally, the system is compact and can be packed away easily and stored when not in use. This aspect greatly increases the marketability of the system, since facilities such as oil and lube facilities, where floor space is at a premium, could purchase and use the system.

A system for detecting rattles, squeaks, or other noise in a vehicle can include a vibration generator 100 as shown in FIG. 1. The vibration generator 100 can include a clamping device 105 for attaching the vibration generator to any portion of the vehicle such as, for example, a pinch weld, frame member, or other accessible surface. In vehicles having a unibody construction, the pinch weld is a seam protruding from the bottom of the vehicle where the body panels meet and join the floor pan. The pinch weld is often used as a jacking location during vehicle servicing. Since the pinch weld is located underneath the vehicle and out of plain sight, marring or slight deformation of the pinch weld is acceptable and is not considered destructive. The pinch weld is easily accessible, making it a desirable location for attaching the vibration generator 100. In vehicles having a body-on-frame design, such as a truck, the vibration generator can be attached to any portion of the frame structure.

The clamping device 105 can include any suitable clamping device. In one example, the clamping device can include a fixed jaw 110 extending therefrom and a sliding jaw 115 movably attached to the fixed jaw by a threaded shaft 120. The jaws of the clamping device 105 can include one insert for each jaw, and the surfaces of the inserts can include knurling to improve grip on vehicle surfaces, such as a pinch weld. The clamping device can be tightened using any suitable tool, such as a socket wrench. In another example, the clamping device can include a quick clamp device to allow for quick attachment and removal without requiring hand tools. In another example, the clamping device can include a swivel to allow it to rotate through a variety of angles such as, for example, 45 to 90 degrees to alter the axis through which vibrations are transmitted to the vehicle.

Figure 4:
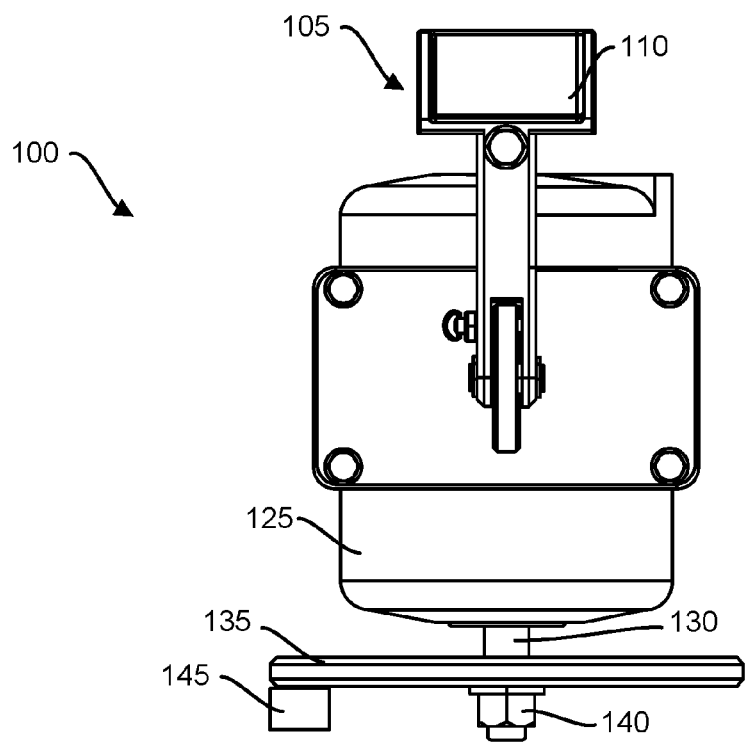
FIG. 4 is a front view of the example vibration generator in FIG. 1.
Figure 5:
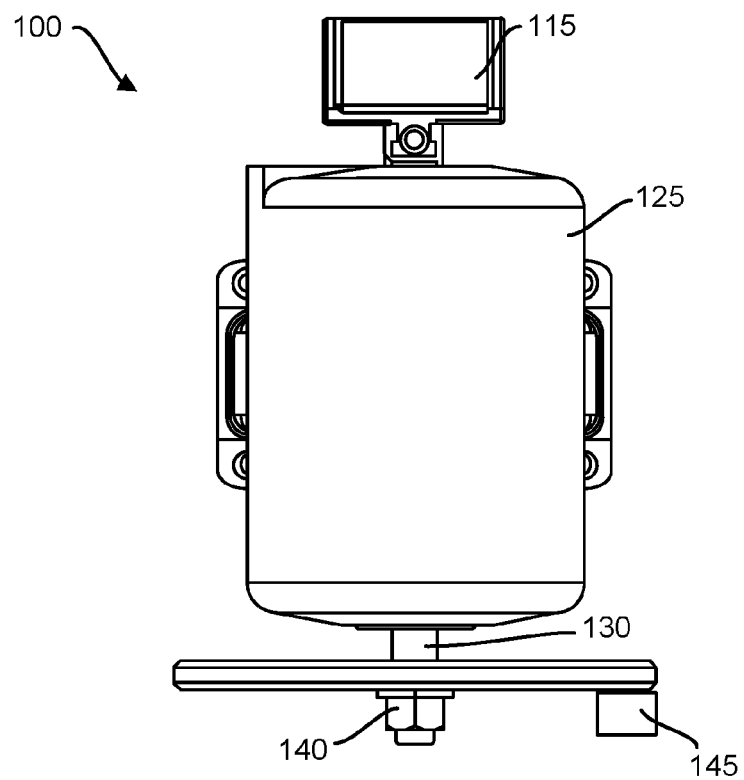
FIG. 5 is a back view of the example vibration generator in FIG. 1.
Figure 6:
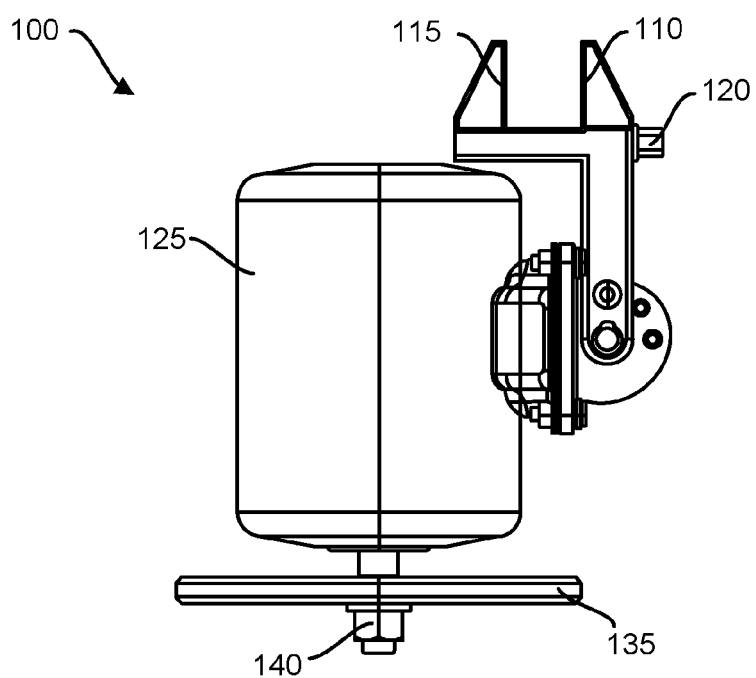
FIG. 6 is a left side view of the example vibration generator in FIG. 1.
Figure 7:
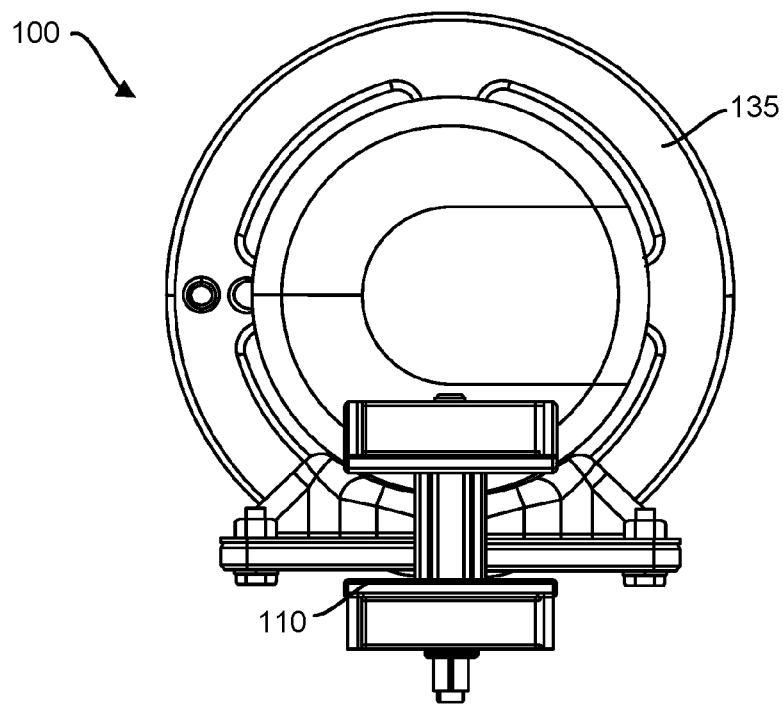
FIG. 7 is a top view of the example vibration generator in FIG. 1.
Figure 8:
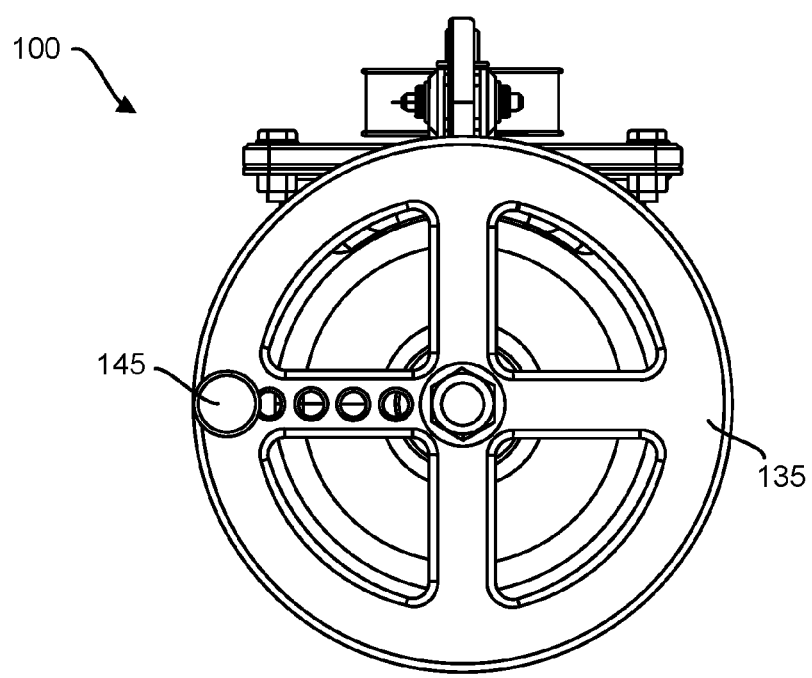
FIG. 8 is a bottom view of the example vibration generator in FIG. 1.
Figure 9:
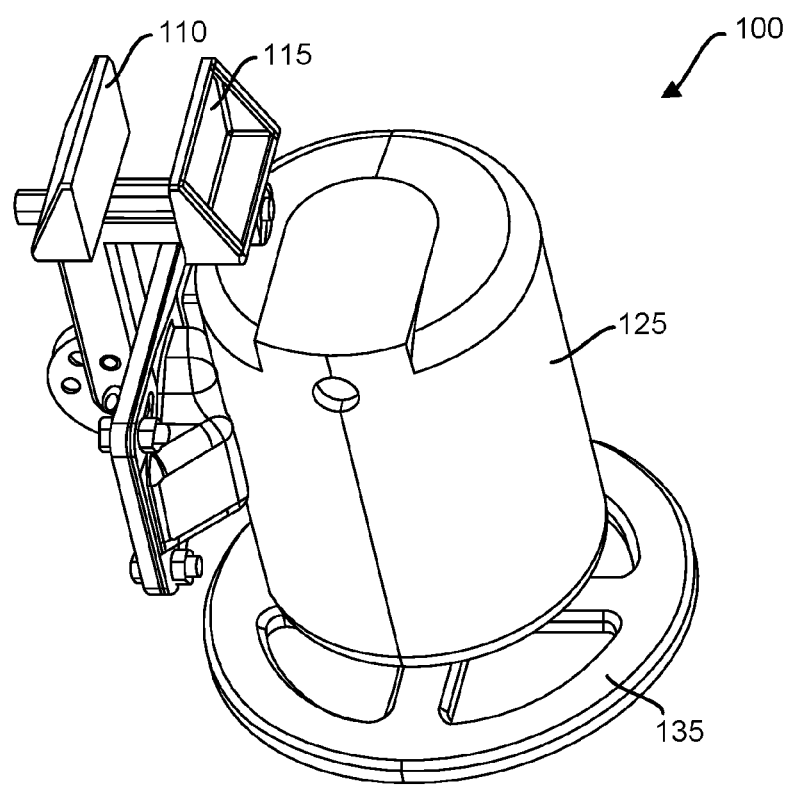
FIG. 9 is a top perspective view of the example vibration generator in FIG. 1.

The vibration generator 100 can include an electric motor 125. The electric motor 125 can be, for example, a three-phase, 120 volt, brushless motor. The motor speed can be variable and can be controlled through a wired or wireless controller. A shaft 130 can extend from the motor and can be attached to a flywheel 135, as shown in FIG. 4. In one example, the shaft 130 can have a keyway to locate the flywheel 135 on the shaft. An end of the shaft 130 can be threaded to allow a nut 140 to be tightened onto the shaft to retain the flywheel.

One or more weights 145 can be attached to the flywheel 135 to provide a rotating imbalance. A rotating imbalance occurs when a center of mass of a rotating part does not lie on the center of rotation. Imbalance causes a centripetal force at the frequency of the rotation rate to be applied to the bearings of the device. Forces caused by imbalance are proportional to the square of the rotation rate (e.g. RPM). Imbalance exists in several forms, including static, couple and dynamic imbalance, which are undesirable in most machines. However, since the goal of the vibration generator is to create a rotating imbalance, intentionally producing these forms of imbalance can be desirable.

Static imbalance is a condition where the principal inertia axis of a rotor is offset from and parallel to the axis of rotation. A rotor with static imbalance will seek a position with the heavy spot at the bottom if placed on level knife-edges. Static imbalance can theoretically be corrected by the addition of a single correction mass. Couple imbalance is a condition where the principal inertia axis intersects the rotation axis of the rotor at the center of gravity. A rotor with couple imbalance will be stable in any position on knife edges, but will produce out-of-phase imbalance forces on the bearings when rotated. Correction of couple imbalance requires the addition of two correction masses. Dynamic imbalance is a combination of static and couple imbalance, and is the most common type found in practice. In dynamic imbalance, the principal inertia axis neither intersects nor is parallel to the axis of rotation. Correction of dynamic imbalance requires at least two correction masses.

The weight 145 can be attached to the flywheel 135 using any suitable method, such as fasteners, magnets, retention features, etc. The location of the weight 145 on the flywheel 135 relative to the central axis of the shaft 130 of the electric motor 125 can be varied in any suitable way to alter the force of the vibration. For instance, the weight 145 can be positioned manually by threading the weight into one of a series of holes in the flywheel 135 extending radially from the center of the flywheel. Alternately, the weight 145 can be adjusted outwardly using an automated system, such as a servo motor, to provide greater adjustability and convenience. By adjusting the weight 145 outwardly from the central axis of the shaft 140, the force of the rotating imbalance can be increased. Likewise, by increasing the mass of the weight, the force of the rotating imbalance can be increased. In one example, the weight 145 can have a mass ranging from 0.25 ounce to 32 ounces. In another example, the weight 145 can have a mass ranging from 0.25 ounce to 2.0 ounces. By increasing the force of the rotating imbalance, the amplitude of the vibration is increased and can make the squeak, rattle, or other noise easier to detect.

Although a vibration generator 100 with a flywheel and an adjustable weight (e.g. a single-plane rotating imbalance) is shown and described, this is not limiting. The vibration generator 100 can be any suitable device capable of producing a vibration that can be transmitted to the vehicle. In one example, the vibration generator 100 can include one or more pre-weighted flyweights that do not require independent, removable weights. In another example, the vibration generator 100 can include a reciprocating piston or other suitable mechanical linkage that generates a vibration that is transmittable to the vehicle. In another example, the vibration generator 100 can be a fluid-based system that produces a vibration that is transmittable to the vehicle. In another example, the vibration generator 100 can be a loudspeaker, such as a subwoofer, that produces a vibration that is transmittable to the vehicle.

A system including the vibration generator can also include a power supply and controller, which can be separate components or an integrated component. In one example, the components can be integrated within a single enclosure. The enclosure can include a power switch to turn the system on and off. The enclosure can also include an adjustable speed controller, which can be, for example, a rotary dial that adjusts the rotational speed of the electric motor. Adjustable speed control circuitry can include a variable resistor, or other suitable electronic device, to enable suitable speed adjustment. The power supply can include a standard three-prong plug configured to mate with a 120 volt receptacle for use in the United States, or the power supply and plug can be modified as required for use in any foreign country.

In most cases, it is likely that a certain frequency with excite the squeak, rattle, or other noise, thereby allowing it to be located and corrected. While a technician could incrementally adjust the rotational speed of the electric motor 125 to replicate a range of frequencies until the certain frequency is identified, this approach would be time consuming and, since a technician is paid hourly, costly to the vehicle owner. To hasten the process, it can be desirable to automatically scan a range of frequencies, similar to techniques used in oscilloscopes, scanning A/D converters or waveform digitizers. In one example, the controller can adjust the frequency of the vibration generator across a range of frequencies from 0 to 20,000 Hz, which includes the hearing range of the average human ear.

At some point while scanning the range of frequencies, the certain frequency will emerge that causes the squeak, rattle, or noise to appear. At this point in the process, the technician can provide feedback to the system to identify the frequency. For example, when the rattle emerges, the technician can press a button that halts scanning and switches the vibration generator to steady-state frequency production to cause the rattle to become constant. This provides the technician time to carefully search for the source of the noise.

In another example, the system can include a sensor that is placed near the location where the noise is suspected of originating from. The sensor can include a microphone that provides feedback to the system. When the noise emerges and its amplitude rises above a threshold value, the controller can halt scanning and switch the vibration generator to steady-state frequency production. In another example, the system can scan the range of frequencies while recording the signal from the sensor, and after completing the scanning process, analyze the response from the sensor, and return to the certain frequency that produced the greatest signal response from the sensor. In some instances, several frequencies may be identified, and the system may return to each for a predefined period of time or as specified by the technician through a graphical user interface (GUI) or other control system.

The controller can include a computer or microprocessor. The controller can also include software to enable scanning of the frequency range, selection of the frequency range, or visual feedback of the response collected from the one or more acoustic sensors. Also, the controller can be configured to control two or more vibration generators to increase the amplitude of the frequency or provide a wider vibrational area on the vehicle.

For safety purposes, the system can include a shroud or enclosure around the rotating members to prevent injury to the technician or damage to the vehicle. The shroud or enclosure would also prevent the device from migrating across a shop floor if it detached from the vehicle during operation and dropped to the floor. Similarly, the vibration generator 100 can include an orientation-based shut-off switch that turns the electric motor 125 off if it tips over or falls, similar to a space heater.

Details of one or more embodiments are set forth in the accompanying drawings and description. Other features, objects, and advantages will be apparent from the description, drawings, and claims. Although a number of embodiments of the invention have been described, it will be understood that various modifications may be made without departing from the spirit and scope of the invention. It should also be understood that the appended drawing is not necessarily to scale, presenting a somewhat simplified representation of various features and basic principles of the invention.

What is claimed is:

1. An apparatus for locating a squeak, rattle, or other unwanted noise in a vehicle, the apparatus comprising:
a vibration generator capable of producing a vibration transmittable to a vehicle, the vibration configured to excite a squeak, rattle, or other unwanted noise in the vehicle, the vibration generator comprising: a variable-speed electric motor having a shaft extending therefrom; a flywheel attached to the shaft extending from the electric motor; and a mass attached to the flywheel, wherein the mass is configured to be movable relative to a centerline axis of the shaft; and
a clamping device attached to the vibration generator and configured to attach to a vehicle.

2. The apparatus in claim 1, further comprising a control system configured to adjust the frequency of the vibration generator.

3. The apparatus in claim 2, wherein the control system comprises a wireless controller.

4. The apparatus in claim 2, wherein the control system comprises a wired controller.

5. The apparatus in claim 1, wherein the mass is manually positioned on the flywheel relative to the centerline axis of the shaft.

6. The apparatus in claim 1, wherein the mass is automatically positioned on the flywheel relative to a centerline axis of the shaft.

7. The apparatus in claim 6, further comprising a servo motor configured to adjust the position of the mass relative to the centerline axis of the shaft.

8. The apparatus in claim 1, wherein the mass ranges from 0.25 to 32 ounces.

9. The apparatus in claim 8, wherein the mass ranges from 0.25 to 2 ounces.

10. The apparatus in claim 1, wherein the clamping device is configured to attach to a pinch weld of the vehicle.

11. The apparatus in claim 1, wherein the clamping device comprises a first jaw and a second jaw, wherein the first and second jaws are configured to be movable toward each other to allow the device to clamp onto the vehicle.

12. The apparatus of claim 11, wherein the first and second jaw are movable toward each other via a threaded screw.

13. The apparatus of claim 11, wherein the first and second jaw are movable toward each other via a quick clamp device.

14. The apparatus of claim 1, wherein the vibration generator is configured to produce a vibration ranging from 0 to 20,000 Hz.

15. The apparatus of claim 1, wherein the vibration generator comprises one or more pre-weighted flyweights.

16. The apparatus of claim 1, wherein the vibration generator comprises a reciprocating piston capable of producing the vibration transmittable to the vehicle.

17. The apparatus of claim 1, wherein the vibration generator comprises a mechanical linkage capable of producing the vibration transmittable to the vehicle.

18. The apparatus of claim 1, wherein the vibration generator comprises a fluid-based system capable of producing the vibration transmittable to the vehicle.

19. The apparatus of claim 1, wherein the vibration generator comprises a loudspeaker capable of producing the vibration transmittable to the vehicle.

20. A method for locating a squeak, rattle, or other unwanted noise in a vehicle, the method comprising:

attaching to a vehicle an apparatus for producing a squeak, rattle, or other unwanted noise in the vehicle, the apparatus comprising a vibration generator and a clamping device attached to the vibration generator, the clamping device configured to attach to the vehicle, the vibration generator comprising: a variable-speed electric motor having a shaft extending therefrom; a flywheel attached to the shaft extending from the electric motor; and a mass attached to the flywheel, wherein the mass is configured to be movable relative to a centerline axis of the shaft; and scanning a range of frequencies with the vibration generator by adjusting the speed of the variable speed electric motor, wherein the range of frequencies is between 0 and 20,000 Hz.

21. The method of claim 20 further comprising:

identifying a certain frequency within the range of frequencies that produces the squeak, rattle, or other unwanted noise; and reproducing the certain vibrational frequency using the vibration generator to allow the squeak, rattle, or other unwanted noise to be located.

22. The method of claim 21, wherein identifying the certain frequency comprises providing feedback to the apparatus.

23. The method of claim 22, wherein feedback is provided to the apparatus by an acoustical sensor.

24. The method of claim 22, wherein feedback is provided to the apparatus by a control operable by a technician.

* * * * *